United States Patent [19]

Thomas, Jr. et al.

[11] 4,009,629
[45] Mar. 1, 1977

[54] APPARATUS FOR CUTTING POLYMER FLAKE

[75] Inventors: Dorsey O. Thomas, Jr., Chesterfield; Alvah B. Terry, St. Louis, both of Mo.

[73] Assignee: Monsanto Company, St. Louis, Mo.

[22] Filed: July 28, 1975

[21] Appl. No.: 599,809

[52] U.S. Cl. .................................... 83/355; 83/913
[51] Int. Cl.² .......................................... B26D 5/20
[58] Field of Search ............. 83/355, 356.3, 356.1, 83/913

[56] References Cited

UNITED STATES PATENTS

| 2,143,252 | 1/1939 | Kornegg | 83/355 X |
| 3,119,294 | 1/1964 | Billingsley et al. | 83/355 X |
| 3,204,505 | 9/1965 | Heijnis | 83/913 X |
| 3,334,533 | 8/1967 | Davis, Jr. | 83/913 X |

FOREIGN PATENTS OR APPLICATIONS

| 25,468 | 6/1963 | Germany | 83/356.3 |

*Primary Examiner*—Travis S. McGehee
*Attorney, Agent, or Firm*—Robert L. Broad, Jr.

[57] ABSTRACT

Strand granulation apparatus characterized by cutter bearing rotors and strand passages wherein the strands are passed through generally cross-sectionally circular shear bushings at the exit end of which they are engaged and severed by the rotating cutters are improved by employing shear bushings having noncircular cross-sections so disposed as to provide random positioning of strands when engaged by the cutters.

1 Claim, 5 Drawing Figures

APPARATUS FOR CUTTING POLYMER FLAKE

BACKGROUND OF THE INVENTION

Commercial man-made polymeric textile fibers and filaments may be manufactured continuously from the raw materials to the finished fiber product. However, it is difficult to synchronize polymerization and fiber spinning and processing. Moreover, many fiber producers do not have the polymerization capability; and of those who have in-house polymerization capability it is sometimes physically remote from fiber spinning and process facilities. For these reasons it is quite common to prepare an intermediate polymeric granule or flake in which form the polymer can be easily handled, sold, stored, shipped, and then melted for further processing.

The granulation of hard brittle material, particularly polymeric material such as polyester polymer, is accomplished commercially only with the finest and hardest of cutter blades under ideal conditions, preferably utilizing the cooling effect of an underwater operation. Flake cutting, according to methods and apparatus described in such patents as U.S. Pat. Nos. 2,850,764, 3,277,519, and 3,600,745, is well known in the art. Flake cutting machines according to these methods and apparatus, when placed in continuous use, require frequent shutting down and resharpening or replacement of cutters. Production time is lost, and replacement cutters are expensive. Since wear and tear on cutter blades is very high, any apparatus by which cutter blade life can be substantially increased or blade wear can be substantially reduced, would be a meritorious advance in the art. Moreover there is a well recognized and long felt need for increased cutter blade life in these machines.

SUMMARY OF THE INVENTION

In accordance with the present invention, the disadvantages of the prior art processes and apparatus are avoided and cutter blade life is substantially increased in rotor type strand granulating machines where a plurality of strand passages are employed, and rotor borne cutters pass shear bushings generally aligned with the exit ends of the strand passages and engage the emerging strands which are positioned between an interior surface of the bushing and a cutter, and thereupon severed by the opposing forces of the cutter and the bushing, by the improved process step of random positioning strands when engaged by the cutters. Random positioning is achieved in an improved granulating machine by employing shear bushings having non-circular cross-sections disposed so as to permit the desired random positioning. Rectangular cross-sections are preferred.

It is an advantage of this invention that such increased cutter blade life can be accomplished without materially increasing the vibration or noise level, both of which are highly critical problems in the granulation of polymeric strands.

"Cutting blade" or "cutter blade", as used herein, means the cutting or severing portion, surface, or edge of the cutter.

The term "cutter", as used herein, means a cutting or severing arm or member, or a plurality thereof, with or without any structural basis, and includes one or more cutter blades.

DESCRIPTION OF THE PREFERRED EMBODIMENTS

Figure 1:
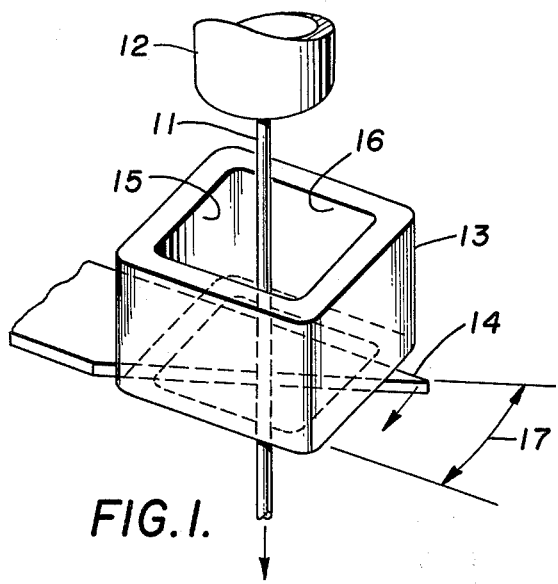
FIG. 1 is a perspective view of the cutting blade and shear bushing of an embodiment of this invention.

Referring now in detail to FIG. 1, a moving strand 11, a freshly extruded solidified polymeric strand, passes downwardly from the strand exit end of a strand passage 12 through a shear bushing 13, whereupon, on emerging therefrom it is severed by moving a cutter 14. The size of the shear bushing relative to the size of the strand is such that in operation a random natural movement of the strand is permitted within the shear bushing. When the strand makes contact with the cutter 14, it may be in any one of several positions along a flat inner surface 15 of shear bushing 13. The relationship of the blade of cutter 14 to the flat inner surface 15 of shear bushing 13 is such that the blade passes at a cutting angle 17 of about 0°–20°, with a preferred cutting angle of 4°–15°. The strand is caught between an edge of the cutter 14 and the straight lower edge of the inner surface 15 and is thereby severed.

Figure 2:
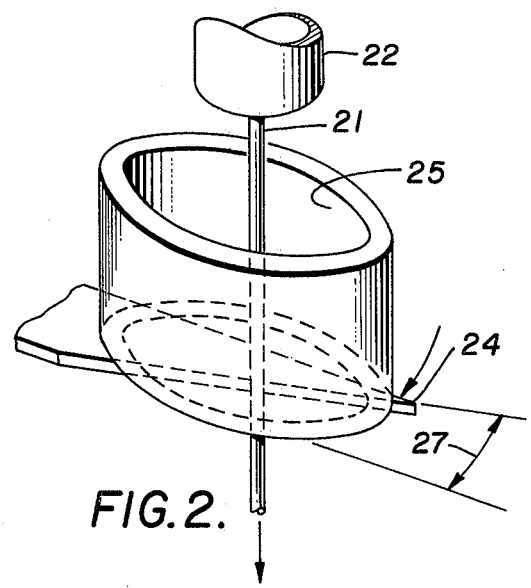
FIG. 2 is a perspective view of the cutting blade and shear bushing of another embodiment of this invention.

Referring now in detail to FIG. 2, a moving strand 21 is a freshly extruded solidified polymeric strand passing downwardly from the strand exit end of a strand passage 22 through a shear bushing 23 whereupon, on emerging therefrom it is severed by a moving cutter 24. In operation, a random natural movement of the strand is permitted within the shear bushing. When the strand makes contact with the cutter 24, it may be in any one of several positions along an inner surface 25 of shear bushing 23. As may be expected the random positioning sought decreases as the cross-sectional shape of that portion of the shear bushing (against which the strand is pressed when cut) approaches the circular in shape, and increases as the cross-sectional shape approaches a straight line.

Figure 3:
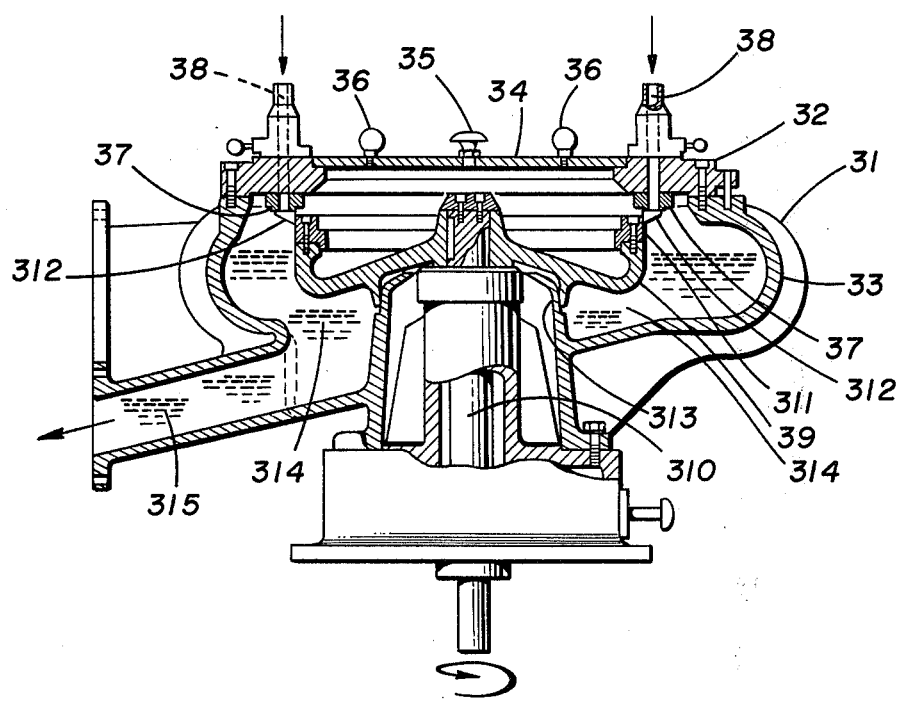
FIG. 3 is an elevation section of a granulation device suitable for employment of the embodiment of either FIG. 1 or 2.

Referring now in detail to FIG. 3, a device of the type disclosed in U.S. Pat. No. 3,600,745 (hereby incorporated by reference), a cutting unit 31 comprises a ring collar 32 attached to a housing 33, being flange mounted thereon. The collar 32, together with a lid 34 centrally mounted therein, form a cover for housing 33. The lid 34 is provided with a vent button 35 and hand knobs 36. On its interface, the collar 32 carries a row of shear bushings 37 aligned with strand passages 38. The shear bushings 37 are made of a highly wear resistant material. In the center of the housing 33 is rotatably arranged a rotor 39 mounted on a vertical shaft 310. The rotor 39 carries on its upwardly facing periphery, a cutter rim 311 to which a plurality of cutters 312 are attached. On its lower side, the rotor 39 has a circular lip cooperating with a tapered portion 313 of the housing 33 to form a centrifugal seal against the inside of the housing. Power is supplied through a shaft 310. Reservoir 314 contains wash water in which the granules are disposed of from the cutter through a passage 315.

Figure 4:
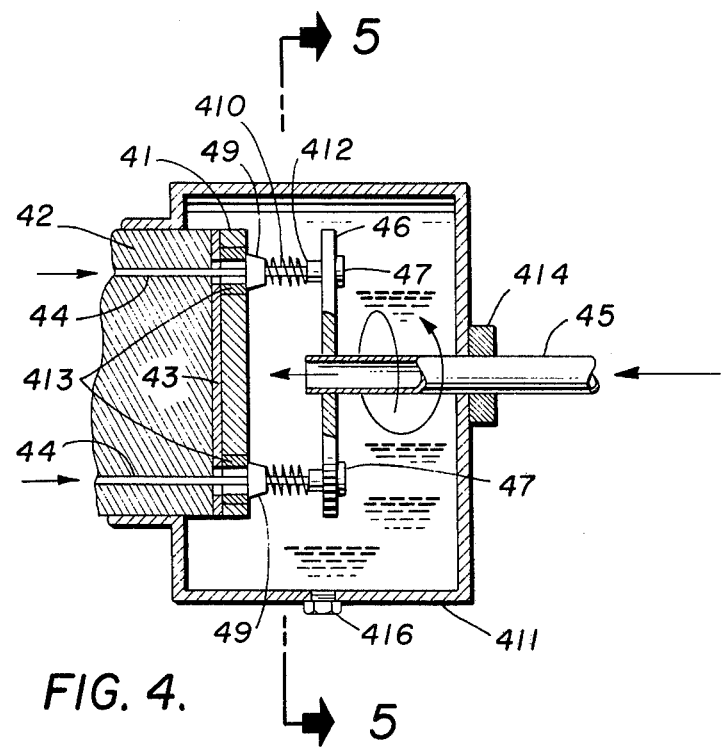
FIG. 4 is an elevation section of another granulation device suitable for employment of the embodiment of either FIG. 1 or FIG. 2; and, FIG. 5 is another elevation section taken along line 5—5 of FIG. 4.
Figure 5:
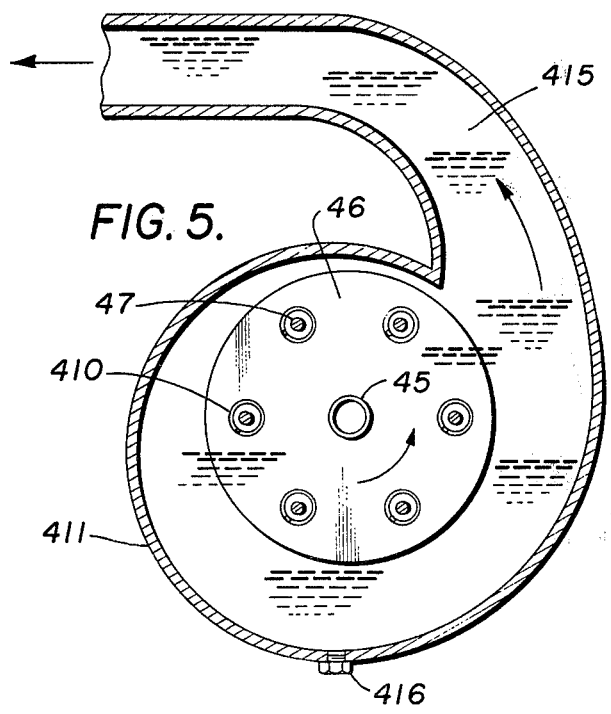

FIGS. 4 and 5 depict an apparatus of the type disclosed in U.S. Pat. No. 2,850,764, (hereby incorporated by reference), improved in accordance with this invention. Referring in detail to FIGS. 4 and 5, a plate 41 is attached to the face of an extrusion die 42 which extends through one wall of a volute casing 411 which contains cooling liquid. An asbestos gasket 43, positioned between the die and the plate 41 insulates the die from the wear plate. Channel 44 is one of a ring of rod-forming extrusion channels which pass from the die through the asbestos gasket, the wall of the casing and the wear plate. Shaft 45 is a hollow rotatable shaft through which cooling liquid is supplied. A circular plate 46 is fixed near the end of the shaft 45 which passes therethrough so that water introduced through the shaft 45 will impinge against the wear plate 41. The circular plate 46 is bored to receive a plurality of equally spaced projecting members 47, on each of which is spring mounted a cutter 49. The shaft 45 can be moved towards and away from wear plate 41 and by this means the knives may be brought into operation against the plate, or out of operation away from the plate. In operation, they are firmly pressed against the plate by coil springs 410 acting between the cutter 49 and shoulders 412 of the projecting member 47. Shear bushing 413 is one of the plurality of shear bushings inset in the wear plate 41. Strand material is fed into the shear bushing 413 from an extrusion channel 44. The assembly is enclosed in the volute casing 411, the front end of which casing is formed from a sheet of transparent plastic material through which the rotatable cutter passes at the gland 414. The casing is provided with an outlet 415 for the cooling liquid and entrained granules of thermoplastic material and with a plugged drainage outlet 416.

In operation, the thermoplastic material is extruded through the circular extrusion channels 4 and the shear bushings 413. Shaft 45 has been previously set so that the cutters 49 are in their cutting position, and they are set in rotation, in a counterclockwise direction, preferably at a speed of not less than 100 revolutions per minute. Cooling liquid, preferably water, is supplied through the center of the shaft 45. The centrifugal pumping action of the rotating cutter and the pressure of liquid entering through the shaft cause the liquid containing the cut granules of thermoplastic material to be carried up the outlet 415 of the casing from which it flows out to a suitable screen upon which the granules may be collected.

Having thus described our invention, and several embodiments thereof, what we desire to claim and secure by Letters Patent is:

1. A strand granulating apparatus comprising
    a. a die having a passageway for forming a strand,
    b. a rectangular shear bushing secured to the die in such a position that the strand passes through said shear bushing, the size of the shear bushing relative to the size of the strand forming passageway being such that the strand is free to vary its position at random as it moves through said shear bushing.
    c. a rotor, and
    d. a cutter mounted on the rotor, said rotor being so positioned that an edge of the cutter cooperates with the edge of one of the inner surfaces of the shear bushing to sever the strand, said cutter edge being at an angle of 4°–15° to the bushing edge when the strand is severed.

* * * * *